United States Patent
Hung et al.

(10) Patent No.: US 10,311,273 B2
(45) Date of Patent: Jun. 4, 2019

(54) THERMAL TAGS FOR REAL-TIME ACTIVITY MONITORING AND METHODS FOR DETECTING THE SAME

(71) Applicant: INTERNATIONAL BUSINESS MACHINES CORPORATION, Armonk, NY (US)

(72) Inventors: Li-Wen Hung, Mahopac, NY (US); Jui-Hsin Lai, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/296,090

(22) Filed: Oct. 18, 2016

(65) Prior Publication Data
US 2018/0107799 A1 Apr. 19, 2018

(51) Int. Cl.
*G06F 17/00* (2019.01)
*G06K 7/14* (2006.01)
*G06K 19/06* (2006.01)

(52) U.S. Cl.
CPC ......... *G06K 7/1413* (2013.01); *G06K 7/1417* (2013.01); *G06K 19/0614* (2013.01); *G06K 19/0615* (2013.01); *G06K 19/06037* (2013.01); *G06K 19/06112* (2013.01)

(58) Field of Classification Search
CPC .. G06K 7/1408; G06K 7/1417; G06K 7/1421; G06K 7/1426; G06K 7/143; G06K 7/1434
See application file for complete search history.

(56) References Cited

U.S. PATENT DOCUMENTS

| | | | |
|---|---|---|---|
| 4,051,726 | A | 10/1977 | Hastbacka |
| 4,998,010 | A | 3/1991 | Chandler et al. |
| 5,357,095 | A | 10/1994 | Weyrauch et al. |
| 5,414,405 | A | 5/1995 | Hogg et al. |
| 5,736,723 | A | 4/1998 | Clarke et al. |
| 5,817,012 | A | 10/1998 | Schoendorfer |
| 6,104,295 | A | 8/2000 | Gaisser et al. |

(Continued)

FOREIGN PATENT DOCUMENTS

| | | |
|---|---|---|
| CN | 101957929 A | 1/2011 |
| CN | 102435142 | 7/2013 |

(Continued)

OTHER PUBLICATIONS

Cabre, et al. "Near Infrared Multifactor Identification Tags" Optics Express, Nov. 2007, vol. 15, No. 23, 13 pages.

(Continued)

*Primary Examiner* — Thien M Le
*Assistant Examiner* — April Taylor
(74) *Attorney, Agent, or Firm* — Tutunjian & Bitetto, P.C.; Vazken Alexanian

(57) ABSTRACT

A thermal tag includes a power source to generate current along a resistive path and a plurality of infrared-emitting features positioned along the resistive path to emit infrared light along an infrared-emitting pattern, wherein the plurality of infrared-emitting features include one or more infrared-emitting stripes on a first surface of the thermal tag defining a pattern region and a plurality of infrared-emitting dots within a portion of the pattern region to provide a thermal-diffusion resistant pattern for activity monitoring.

20 Claims, 7 Drawing Sheets

(56) References Cited

U.S. PATENT DOCUMENTS

| | | | |
|---|---|---|---|
| 6,297,511 | B1 | 10/2001 | Syllaios et al. |
| 7,152,805 | B2 | 12/2006 | Walmsley et al. |
| 7,290,720 | B2 | 11/2007 | Walmsley et al. |
| 7,393,380 | B2 | 7/2008 | Smolsky |
| 8,657,758 | B2 | 2/2014 | Lia et al. |
| 8,659,423 | B2 | 2/2014 | Kuris et al. |
| 8,692,221 | B2 | 4/2014 | Ford |
| 9,060,714 | B2 | 6/2015 | Bajcsy et al. |
| 9,176,990 | B2 | 11/2015 | Stuart et al. |
| 9,291,607 | B2 | 3/2016 | Chen et al. |
| 9,823,747 | B2 * | 11/2017 | Underkoffler ............ G06F 3/017 |
| 2007/0291473 | A1 | 12/2007 | Traynor |
| 2008/0138289 | A1 * | 6/2008 | Goronkin ............ A61K 49/0063 424/9.4 |
| 2010/0011982 | A1 * | 1/2010 | Wich ...................... F41G 7/007 102/387 |
| 2010/0086235 | A1 | 4/2010 | Loughrey et al. |
| 2010/0182153 | A1 | 7/2010 | Jensen |
| 2010/0189313 | A1 | 7/2010 | Prokoski |
| 2011/0001605 | A1 | 1/2011 | Kiani et al. |
| 2011/0105854 | A1 | 5/2011 | Kiani et al. |
| 2011/0163683 | A1 | 7/2011 | Steele et al. |
| 2012/0215113 | A1 | 8/2012 | Yarden et al. |
| 2013/0079605 | A1 | 3/2013 | Bandaru et al. |
| 2014/0276167 | A1 | 9/2014 | Dasupta et al. |
| 2014/0332667 | A1 | 11/2014 | Aramaki et al. |
| 2014/0341588 | A1 | 11/2014 | Pederson |
| 2015/0123788 | A1 | 5/2015 | Greenberg et al. |
| 2016/0065909 | A1 | 3/2016 | Derenne et al. |
| 2017/0332904 | A1 | 11/2017 | Gannon et al. |
| 2018/0228072 | A1 | 8/2018 | Cresswell et al. |

FOREIGN PATENT DOCUMENTS

| | | |
|---|---|---|
| CN | 103013520 B | 6/2014 |
| CN | 205197971 U | 5/2016 |
| CN | 105675155 A | 6/2016 |
| DE | 201220011209 | 8/2013 |
| EP | 0813073 | 12/1997 |
| FR | 2595852 A1 | 9/1987 |
| FR | 2932302 | 12/2009 |
| JP | 8295322 | 11/1996 |
| JP | 2007-127536 | 5/2007 |
| JP | 2007127536 A | 5/2007 |
| JP | 4491285 B2 | 6/2010 |
| JP | 4798808 B1 | 10/2011 |
| JP | 2014090424 A | 5/2014 |
| TW | M265283 U | 5/2005 |
| WO | WO9318476 A1 | 9/1993 |
| WO | 00/6551 | 11/2000 |

OTHER PUBLICATIONS

Wikipedia "QRCode" www.wikipedia.org, Modified Oct. 2016, pp. 1-16. Available at: https://en.wikipedia.org/wiki/QR_code.

Zhou, Z. et al., "A Real-time System for In-home Activity Monitoring of Elders" 31st Annual International Conference of the IEEE EMBS (Sep. 2009) pp. 6115-6118.

Jalal, A. et al., "A depth video sensor-based life-logging human activity recognition system for elderly care in smart indoor environments" Sensors (Jul. 2014) pp. 11735-11759, vol. 14, No. 7.

Zhang, et al. "Covert IR Optical Taggants Enhance Identification" Photonics Spectra Feb. 2014, 8 pages.

Versus "Versus Announces New Wi-Fi Real-time Locating Platform and Asset Tag" www.VersusTech.com, Dec. 2015, 2 pages, available at http://www.versustech.com/rtls-news/press-releases/new-wi-fi-rtls-asset-tag/.

List of IBM Patents or Patent Applications Treated as Related dated Oct. 18, 2016, 2 pages.

U.S. Office Action issued in U.S. Appl. No. 15/296,115, dated Sep. 24, 2018, pp. 1-20.

Office Action dated Mar. 22, 2018 for U.S. Appl. No. 15/205,666.

U.S. Final Office Action issued in U.S. Appl. No. 15/296,115, dated Dec. 26, 2018, pp. 1-10.

Final Rejection for U.S. Appl. No. 15/205,666 dated Mar. 11, 2019 (18 pages).

Notice of Allowance for U.S. Appl. No. 15/296,115 dated Apr. 3, 2019, 11 pages.

* cited by examiner

THERMAL TAGS FOR REAL-TIME ACTIVITY MONITORING AND METHODS FOR DETECTING THE SAME

BACKGROUND

Technical Field

The present invention generally relates to activity monitoring and, in particular, to thermal tags to track activity with minimal privacy concerns and methods for detecting the same.

Description of the Related Art

There is a significant need to monitor patient activity, for example during convalescence or for elder care in the home. In such cases, a doctor may need to know how treatments, or the symptoms of a disease, are progressing despite the patient being at a remote location. However, conventional video monitoring poses significant privacy concerns. In particular, while a conventional color camera provides the ability to remotely monitor a patient's activity, such cameras will also capture information that may include, for example, images displayed on a computer or television screen or the writing on a sheet of paper. As a result, patients may be reluctant to allow such monitoring, despite the definite benefits that the monitoring might otherwise provide.

Visual tags having matrix barcodes, such as Quick Response (QR) Codes, provide a way to track and/or monitor objects. Such tags may include a machine-readable optical label containing information about the item to which it is attached. For example, QR Codes include a visual pattern comprising black modules (e.g., squares) tightly arranged and packed in a square pattern on a white background. However, such tags may be effected by thermal diffusion which may distort the barcodes and render the pixel information within such tag unreadable when employing thermal imaging. For example, thermal diffusion may cause the visual pattern of the QR Code to become blurred and distorted. Thermal diffusion may occur, for example, with air flow around thermal tags, temperature differences between hot spots and cold spots, or during cold weather. Thus, thermal tags having a pattern resistant to thermal-diffusion is important.

SUMMARY

A thermal tag comprising a power source to generate current along a resistive path, and a plurality of infrared-emitting features positioned along the resistive path to emit infrared light along an infrared-emitting pattern, wherein the plurality of infrared-emitting features include one or more infrared-emitting stripes on a first surface of the thermal tag defining a pattern region and a plurality of infrared-emitting dots within a portion of the pattern region to provide a thermal-diffusion resistant pattern for activity monitoring.

A method for activity monitoring, comprising capturing an infrared image of an environment that comprises at least one patient being monitored and at least one infrared-emitting tag, detecting a plurality of infrared-emitting features arranged in an infrared-emitting pattern on the at least one infrared-emitting tag, wherein the plurality of infrared-emitting features include one or more infrared-emitting stripes on a first surface of the at least one infrared-emitting tag defining a pattern region and a plurality of infrared-emitting dots within a portion of the pattern region to provide a thermal-diffusion resistant pattern, and tracking a relationship between the patient being monitored and the at least one infrared-emitting tag using a processor.

A non-transitory computer readable storage medium comprising a computer readable program for activity monitoring, wherein the computer readable program, when executed on a computer, causes the computer to execute capturing an infrared image of an environment that comprises at least one patient being monitored and at least one infrared-emitting tag, detecting a plurality of infrared-emitting features arranged in an infrared-emitting pattern on the at least one infrared-emitting tag, wherein the plurality of infrared-emitting features include one or more infrared-emitting stripes on a first surface of the at least one infrared-emitting tag defining a pattern region and a plurality of infrared-emitting dots within a portion of the pattern region to provide a thermal-diffusion resistant pattern, and tracking a relationship between the patient being monitored and the at least one infrared-emitting tag using a processor.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Embodiments of the present invention use infrared-emitting thermal tags and infrared cameras for activity monitoring. Infrared imaging detects electromagnetic radiation in the infrared band, which is invisible to the naked eye and which is commonly created by warm objects (such as, e.g., the human body). Infrared light can also be generated by artificial means. As such, the present embodiments track motion of the patient using the thermal tags and infrared camera and, in addition, tracks the patient's interactions with objects in the environment through the use of infrared emitting tags attached to objects of interest.

Figure 1:
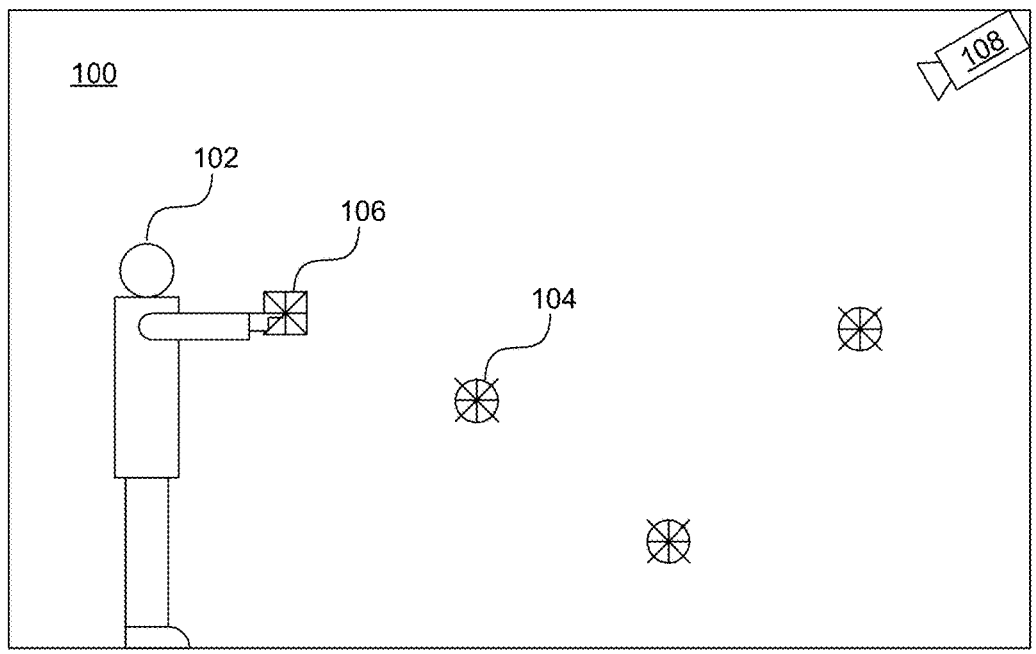
FIG. 1 is a diagram of a monitored environment in accordance with an embodiment of the present invention.

Referring now to FIG. 1, an exemplary monitoring environment 100 is shown. The environment 100 includes at least one user 102. The user 102 may be, for example, a person who is injured or sick, an elderly person, or any person who would benefit from activity monitoring. In addition, a number of objects 104 are present in the environment 100 that include thermal tags. The objects 104 emit a continuous or pulsed infrared signal via the thermal tags. In an embodiment using a pulsed infrared signal, each object 104 may be assigned a unique pattern that distinguishes the object from other objects.

An infrared monitoring device 108 captures infrared information from the environment. It should be noted that multiple monitoring devices 108 may be used in a single environment to cover all of the potential angles of view. The monitoring device 108 may take still images or may alternatively capture video of the infrared emissions of the environment 100. It should be understood that the present principles may be applied to other types of imaging device, but infrared is particularly contemplated because human bodies inherently emit detectable levels of infrared radiation. Limiting the monitoring device 108 strictly to infrared is not needed for the functioning of the present embodiments, but serves to prevent potential privacy infringement that might arise from recording visible light information.

The user 102 emits infrared radiation by virtue of body heat, while the objects 104 emit infrared radiation from their respective thermal tags. This infrared light is captured by the monitoring device 108 and can be used to show the user's activities in the environment 100. For example, if the user 102 picks up an object 106 (e.g., a cane), the monitoring device 108 will capture that event. However, being limited to infrared radiation, the monitoring device 108 will not detect untagged objects unless they differ in temperature from the ambient temperature. As a result, the monitoring device 108 is not able to resolve the details of printed subject matter or the display of screens, as these surfaces generally present a uniform temperature that does not depend on the content.

The information captured by the monitoring device 108 can be of significant use in medical treatment. It may be of interest, for example, how often a patient suffering from Parkinson's disease uses a cane. A thermal tag may therefore be attached to the cane, such that instances where the user 102 is carrying the cane may be recorded and logged.

Figure 2:
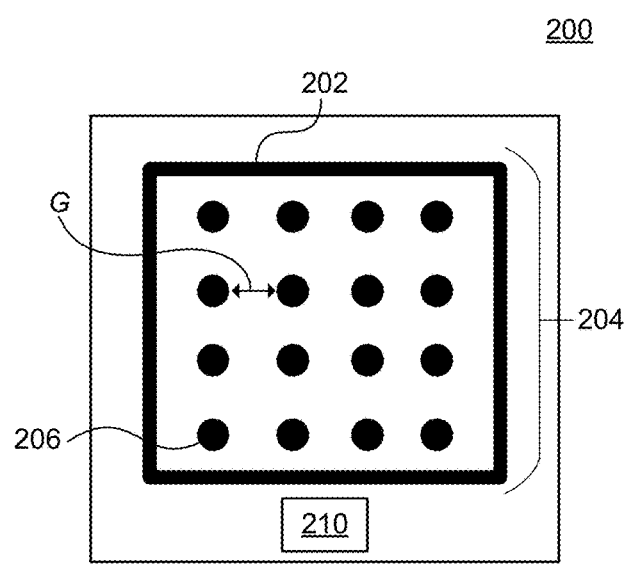
FIG. 2 is a top view showing an infrared-emitting tag in accordance with an embodiment of the present invention.

Referring now to FIG. 2, with continued reference to FIG. 1, a diagram of an exemplary infrared tag 200 is shown. The tag 200 includes one or more infrared-emitting features (e.g., stripes 202, dots 206) arranged along a resistive path to emit an infrared-emitting pattern. The stripes 202 and dots 206 can be composed of one or more light emitting diodes (LEDs), such as a cascade of LEDs) and/or circuit resistance on a plate. In some embodiments, the infrared-emitting features 202, 206 include a metal material, such as a wolfram material (e.g., tungsten). In some embodiments, the infrared emitting features 202, 206 include one or more light emitting diodes (LEDs). For example, the stripes 202 include one or more LEDs positioned along the resistive path such that the stripes 202 emit infrared light having a substantially linear pattern. Similarly, the dots 206 include one or more LEDs positioned along the resistive path such that the dots 206 emit infrared light having a particular shape (e.g., circular). The stripes and dots 206 are positioned, therefore, in such a manner that when the infrared-emitting features 202, 206 emit infrared light, the infrared-emitting features 202, 206 form a distinct thermal pattern 204. The infrared-emitting pattern compensates thermal diffusion and is easily detected using thermal imaging techniques. In some embodiments, the infrared-emitting features 202, 206 are positioned on a first surface of the tag 200 which faces a monitoring device 108.

When power/heat is applied to the infrared-emitting features 202, 206, the infrared-emitting features 202, 206 generate and/or emit infrared light in the form of an infrared-emitting pattern. The infrared-emitting pattern may include certain information which can be extracted to create context of the captured thermal images of a human's activities and interactions of objects in an environment. For example, the infrared-emitting pattern identifies a tagged object (e.g., object 104 in environment 100), a distance between the tagged object 104 and a thermal sensor (e.g., monitoring device 108), and/or an orientation of the tagged object 104 in a three-dimensional space.

The tag 200 includes one or more infrared-emitting features (e.g., 202, 206) arranged in a pattern region 204. The infrared-emitting features include, for example, one or more stripes 202 and/or a plurality of dots 206 arranged along a resistive path (not shown) in a predetermined pattern across a first surface of the tag 200. The resistive path, for example, includes metal connections which connect a power source 210 to one or more of the infrared-emitting features 202, 206. Accordingly, the infrared-emitting features 202, 206 which couple to the resistive path emit infrared light.

In some embodiments, the infrared-emitting features includes at least one stripe 202 which defines a pattern region 204 on the tag 200. In an embodiment, the infrared-emitting features includes at least two stripes 202 orthogonal to one another (e.g., at a right angle, perpendicular). In further embodiments, the infrared-emitting features includes at least four stripes 202 forming a box further defining the pattern region 204. The stripes 202, which are coupled to the resistive path, emit infrared light which may be employed for tag calibration, as will be described in further detail below. The stripes 202 have a sufficient thickness and/or emit a stripe infrared pattern having a sufficient thickness such that stripes 202 are recognizable and/or readable when thermal imaging methods are employed. In an embodiment, the stripes 202 may have a thickness of 0.5 centimeters (cm), however other thicknesses are readily contemplated.

In some embodiments, characteristics of the stripes 202 define the pattern region 204 that may be detectable using thermal imaging techniques. For example, the length of each stripe 202 defines at least one dimension of the pattern region 204 such that the dots 206 are arranged/positioned within a portion of the pattern region 204. When two orthogonal stripes 202 are employed, the stripes 202 define two dimensions of the pattern region 204, such as length and width. Accordingly, the monitoring device 108 may locate the pattern region 204 and/or dots 206 on the tag 200 by detecting the one or more infrared-emitting stripes 202.

In some embodiments, the infrared-emitting features include a plurality of infrared-emitting dots 206. The dots 206 are arranged along the resistive path and within a portion of the pattern region 204. As shown in FIG. 2, the plurality of dots 206 are positioned/arranged in a matrix configuration such that each dot 206 is located in a respective column and row of the matrix. The dots 206 are positioned such that the dots are separated by a gap G, the gap G being a non-infrared-emitting surface on the tag 200 (e.g., a white background). The amount of and/or position of the dots 206, which emit infrared light in an infrared-emitting pattern, includes information associated with the tagged object 104, such as the identity of the tagged object 104. For example, one infrared-emitting pattern having three dots 206 in their respective positions may be indicative of a cane, whereas a second infrared-emitting pattern having six dots 206 in their respective positions may be indicative of a medicine bottle. The identity of objects and their respective infrared-emitting patterns 204 may be stored in a storage device, such as memory 904 of FIG. 9. It should be noted that while round dots 206 are shown, other shapes and dimensions are readily contemplated. For example, the dots 206 can be square shaped, oval shaped, triangular shaped, etc.

The infrared-emitting dots 206 are separated from each other within the pattern region 204 by a gap G. The gap G includes a non-infrared-emitting surface such that the gap G does not emit infrared light. The minimum distance between each adjacent infrared-emitting dot 206 may depend on various factors, such as imaging resolution of the thermal sensor (e.g., monitoring device 108), physical distance between the tag 200 and the thermal sensor 108, and/or thermal-diffusion property of the tag 200. In some embodiments, the gap G includes various distances such as, but not limited to, a diameter of one of the infrared-emitting dots 206. The gap G may include a non-infrared-emitting surface, such as a white background, such that the gap G and/or white background within the pattern region 204 is not detected when employing thermal imaging techniques.

The tag 200 includes a power source 210. The power source 210 may be any appropriate device for storing or generating electrical power. In one example, the power source 210 may be a simple battery (e.g., a coin cell or other small battery). In another example, the power source 210 may convert power from, e.g., light or motion into electrical energy that may then be stored in a battery or capacitor.

The power source 210 supplies electrical power to the resistive path (not shown). In one embodiment, the resistive path may include connections (e.g., metal connections) that connect the infrared-emitting features 202, 206 in a web-like manner. For example, the resistive path may include a metal gridline formed beneath the infrared-emitting features 202, 206. When a current is passed through the resistive path, heat is generated and infrared light is emitted from the infrared-emitting features 202, 206. The layout of the resistive paths may be made unique to each infrared tag 200, such that a monitoring device 108 can recognize the infrared-emitting pattern 204 and thereby identify the object 104 to which the infrared tag 200 is attached.

In an alternative embodiment, the infrared-emitting features 202, 206 include infrared light emitting diodes (LEDs) that emit an infrared signal when a current passes through it (e.g., passes through the resistive path). As described above, a unique pattern of infrared LEDs may be laid out for each infrared tag 200. Alternatively, the output of the infrared LED may be modulated according to a unique pattern.

The infrared tags 200 may be attached with a known orientation and location on each object 104 of interest in the environment 100. Based on the images captured by the monitoring device 108, which show only the contour of the user's body 102 the infrared-emitting pattern 204 being emitted by the tags 200, images of the user's walking patterns and interactions with the objects 104 can be reconstructed.

Figure 3:
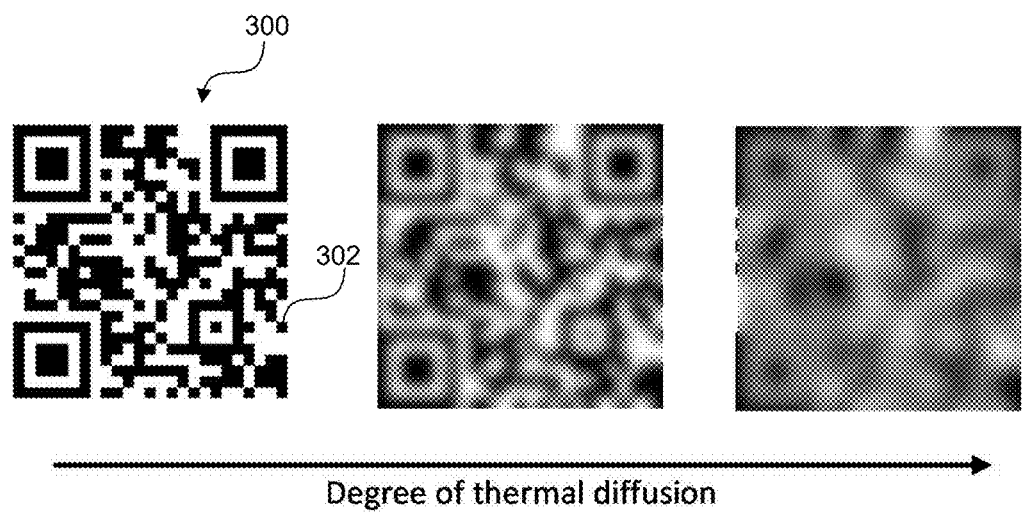
FIG. 3 is a top view showing a thermal image of a conventional Quick Response (QR) Code.

Now referring to FIG. 3, a conventional visual tag 300 having a QR Code is shown for illustrative purposes. QR Codes 300 may include a visual pattern having black modules 302 (e.g., squares) which are tightly arranged and packed in a square pattern on a white background. When the degree of thermal diffusion increases (shown by arrow), the level of distortion of the QR Code 300 increases. As shown in FIG. 3, the black modules 302 of the QR Code 300 become blurry and distorted as thermal diffusion intensifies. Accordingly, such QR Codes 300 are negatively affected by thermal diffusion imaging, thereby rendering the pixel information (e.g., black modules 302) within such QR Code 300 unreadable.

Figure 4:
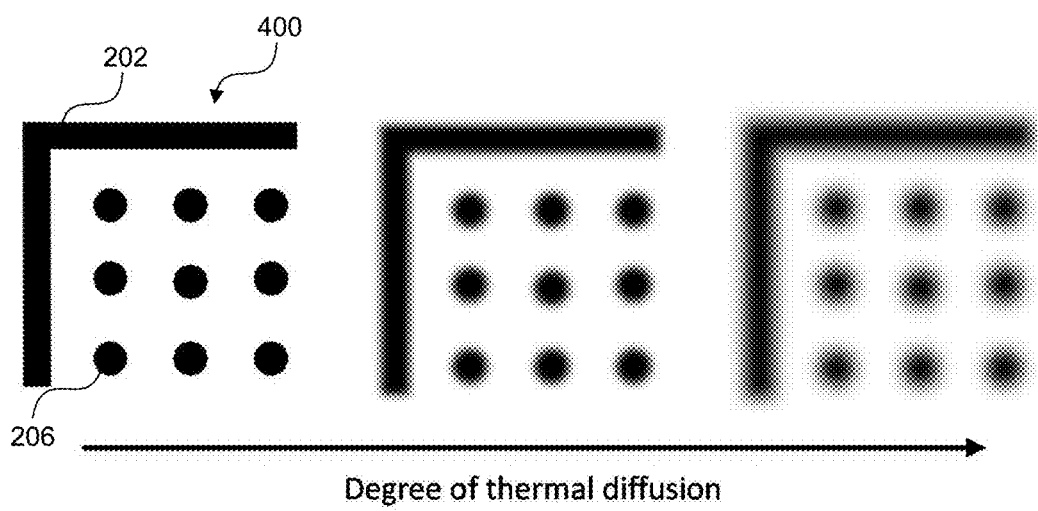
FIG. 4 is a top view showing a thermal image of an infrared-emitting tag in accordance with the present invention.

FIG. 4 illustratively depicts an exemplary infrared-emitting pattern 400 emitted from the thermal tag 200 in accordance with the present principles. The infrared-emitting stripes 202 and infrared-emitting dots 206 emit infrared light when current is applied to the resistive path, thereby forming the infrared-emitting pattern 400 which is captured in a thermal image. Accordingly, portions of the tag 200 which do not emit infrared light (e.g., non-infrared-emitting features), such as edges of the tag 200, are not shown in the thermal image.

As shown in FIG. 4, the stripes 202 and dots 206 emit infrared light in an infrared-emitting pattern 400 which is more resistance to thermal diffusion in comparison to the tightly packed square modules 302 of the visual QR Code 300. Thus, thermal diffusion does not negatively affect the ability to read the tag 200. In FIG. 4, the infrared-emitting pattern 400 (e.g., emitted infrared light from stripes 202 and dots 206) is still recognizable even when thermal diffusion in the environment has intensified. A thermal tag sensor, such as monitoring device 108, detects and/or reads the infrared-emitting pattern 400 despite the effects of thermal diffusion. Accordingly, such tags 200 may be successfully employed in thermal imaging techniques to monitor and/or track a user's interaction with such tagged objects 104.

Figure 5:
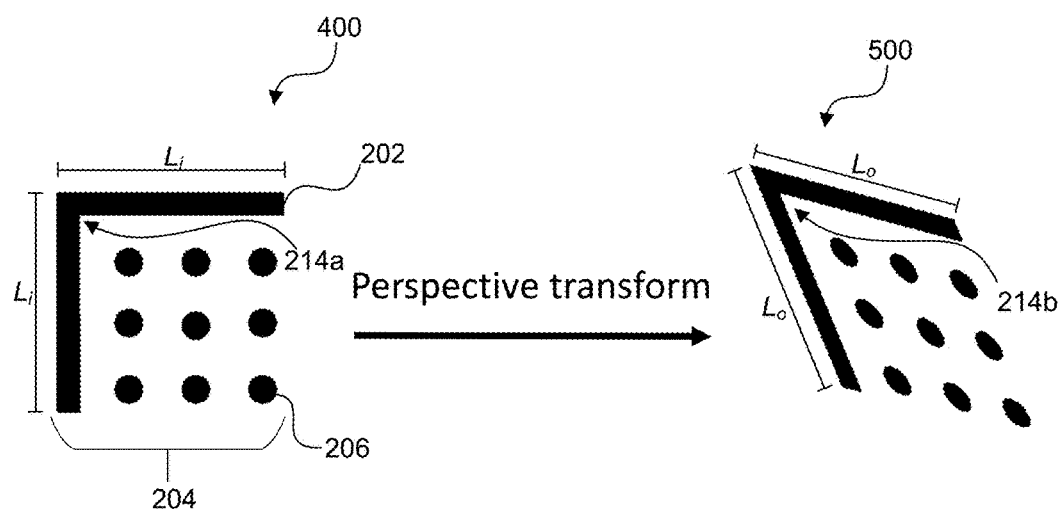
FIG. 5 is a top view showing a thermal image of an infrared-emitting tag in accordance with the present invention.

Now referring to FIG. 5, with continued reference to FIG. 1, a perspective transform of a thermal tag 200 is illustratively depicted. In some embodiments, perspective transform of the infrared-emitting pattern 400 (e.g., stripes 202) can be employed for geometric calibration of the tagged object 104 to determine a distance between the tagged object 104 and the monitoring device 108. In some embodiments, geometric calibration of the infrared-emitting pattern 400 (e.g., stripes 202) can be employed to determine an orientation of the tagged object 104 in a three-dimensional space. For example, a user's interactions with a tagged object 104 may include turning the tagged object 104, such as when a user 102 takes medicine (e.g., a medicine bottle, which may be tagged, may be turned more than ninety degrees to dispense the medicine). Accordingly, the present invention employs perspective transform and/or geometric calibration to further track and/or monitor a user's interaction with a tagged object 104 in a three-dimensional environment.

In some embodiments, the infrared-emitting pattern 400 emits infrared light along at least two stripes 202 which are orthogonal to each other and form a right angle 214a (e.g., ninety degree angle) between adjacent stripes 202. The stripes 202 are connected at a distal end of the stripe 202. In addition, each of the at least two stripes 202 can comprise an actual or initial length $L_i$. The stripes 202 may have the same length, as shown in FIG. 5, however it is readily contemplated that the stripes 202 may comprise different lengths. For example, the initial length of the stripes 202 may be approximately 3 cm such that the infrared-emitting pattern 400 emits infrared light approximately 3 cm along stripe 202. The initial length(s) $L_i$ may be stored in a storage device and/or database. In some embodiments, the initial length(s) $L_i$ may define the thermal pattern region 204. For example, the pattern region 204 includes a dimension of $L_i \times L_i$.

When the tag 200 directly faces the monitoring device 108, the infrared-emitting pattern 400 emits infrared light along the stripes 202 which appear to be orthogonal and/or form a right angle 214a. However, when the tag 200 is not facing directly towards the monitoring device 108, such as when the tag 200 and/or tagged object 104 is rotated (e.g., rotated horizontally) away from/toward the monitoring device 108, the infrared-emitting pattern 400 distorts to infrared-emitting pattern 500. Infrared-emitting pattern 500 (e.g., perspective transform of the tag 200) emits infrared light along the stripes 202 which no longer appear orthogonal. In addition, the infrared-emitting pattern 500 emits infrared light along the stripes 202 which appear reduced/enlarged in length (e.g., an observed length $L_o$). In an embodiment, an observed angle 214b from infrared-emitting pattern 500 may appear to be altered (e.g., reduced) from the original infrared-emitting pattern 400.

The difference between the length of the stripes 202 and/or angle between the orthogonal stripes 202, as emitted in the infrared-emitting pattern 400, 500, may be indicative of the orientation of the tag 200 and/or tagged object 104 in environment 100. For example, the observed length $L_o$ and/or observed angle 214b, when compared with the actual/original length $L_i$ and/or actual/original angle 214a, may provide information regarding the distance of the tag 200 to the monitoring device 108. Thus, a monitoring system can determine physical context of the tag 200 and/or tagged item 104 in a three-dimensional environment, the physical context being distance, orientation, and/or movement (in time domain).

In some embodiments, the infrared-emitting pattern 500 emits infrared light along stripes 202 that appear reduced in length and/or non-orthogonal in the thermal image when the tag 200 is rotated towards and/or away from the monitoring device 108. The smaller length (e.g. observed length $L_o$) of stripe 202 within the thermal image, the further distance between the thermal sensor and the tag 200. Accordingly, perspective transform of the infrared-emitting pattern 500 (e.g., stripes 202) can be employed to determine the distance between the tag 200 and/or tagged object 104 and the monitoring device 108, and/or an orientation of the tagged object 104 in a three-dimensional space.

Each stripe 202 may extend a physical (e.g., actual) length $L_i$ along the tag 200. Each stripe's 202 respective actual length may be predetermined and/or known by an activity monitoring system. When the tag 200 is rotated and/or brought closer to/further from the monitoring device 108, the observed length $L_o$ of the stripe 202 in the infrared-emitting pattern 500 may differ from the actual physical length $L_i$, as shown in infrared-emitting pattern 400. Some objects appear smaller as their distance from a sensor and/or observer increases, which is known as foreshortening. Foreshortening is the visual effect that causes an object or distance to appear shorter than it physically is because it is angled toward the sensor and/or viewer. For example, the observed length $L_o$ may be larger or smaller than the physical length $L_i$, which may be indicative of a distance of the tagged object 104 to the monitoring device 108, especially when the actual physical dimensions $L_i$ (e.g., lengths) of the stripes 202 are already known.

When the tag 200, or portions thereof, is closer to the monitoring device 108, the observed length $L_o$ in infrared-emitting pattern 500 may be larger than the actual length $L_i$ in infrared-emitting pattern 400. When the tag 200, or portions thereof, is further from the monitoring device 108, the observed length $L_o$ may be smaller than the actual length $L_i$. The monitoring device 108 and/or activity monitoring system may determine an approximate distance to the tag 200 and/or tagged object 104 based on such measurements of the stripe(s) 202 viewed/observed by the monitoring device 108.

In an embodiment, position of the infrared-emitting stripes 202 is indicative of an orientation of the thermal tag 200. For example, a thermal tag 200 may have a known orientation of stripes 202. As shown in FIG. 5, the position of the stripes 202 (e.g., top edge and left edge of thermal tag 200) may be stored in a database. When the thermal tag 200 is rotated, position of the infrared-emitting stripes 202 may appear rotated in the thermal image. For example, assume the thermal tag 200 has two orthogonal stripes 202 positioned along the top edge and the left edge, as shown in FIG. 5. When the thermal tag 200 is rotated ninety degrees counterclockwise, the stripes 202 in the infrared-emitting pattern 400 appear on the bottom edge and the left edge. Conversely, when the thermal tag 200 is rotated ninety degrees clockwise, the stripes 202 in the infrared-emitting pattern 400 appear on the top edge and the right edge. Accordingly, a known orientation of the stripes 202 can be compared with an observed orientation of the stripes 202 to determine orientation of the thermal tag 200 in an environment 100.

Figure 6:
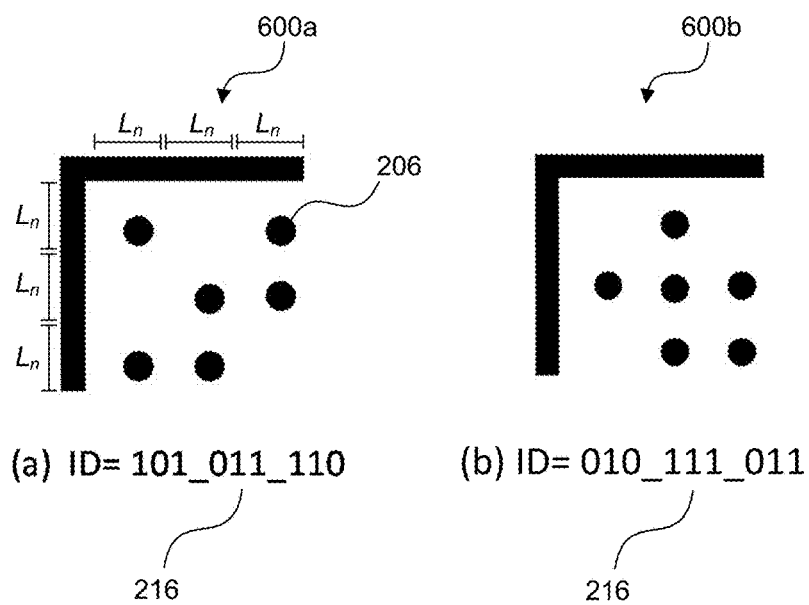
FIG. 6 is a top view showing a thermal image of an infrared-emitting tag in accordance with the present invention.

Now referring to FIG. 6, with continued reference to FIG. 1, two different infrared-emitting patterns 600a, 600b are illustratively depicted. In some embodiments, the tag 200 includes a plurality of infrared-emitting dots 206 arranged in different positions to emit different infrared-emitting patterns 600a, 600b. As described above, the dots 206 are arranged in a matrix configuration such that each dot 206 is associated with a respective row and column within the pattern region 204. Each matrix configuration (e.g., arrangement of dots 206) is associated with a respective object, which may be stored in a database. Accordingly, the infrared-emitting pattern 600a, 600b includes different matrix configurations such that the position of the dots 206 are indicative of a particular object 104 the tag 200 is attached to. For example, the infrared-emitting pattern 600a, 600b represents a code identifying the tagged object 104 (e.g., cane, medicine, etc.).

In an embodiment, the stripes 202 define dimensions of the pattern region 204 such that the infrared-emitting dots 206 are positioned within a portion of the pattern region 204. For example, the actual length $L_i$ of the stripes 202 can be divided into $L_n$ regions, wherein each $L_n$ region corresponds to a column and/or row of the matrix configuration. A dot 206 can be positioned in a $L_n$ region such that each $L_n$ region includes a single dot. As described above, while the present description defines the pattern as including a plurality of dots, other symbols and/or shapes are readily contemplated.

In some embodiments, the position of the plurality of dots 206 represents a binary code 216 which identifies the tagged object 104. The binary code 216 associated with a tagged object 104 can be predetermined and may be stored in a storage device (e.g., memory, database, etc.). As shown in FIG. 6, infrared-emitting patterns 600a and 600b are shown with a total of six infrared-emitting dots 206. Each dot 206 corresponds to a zero or a one forming the binary code 216 (e.g., identification code). A binary code represents, for example, text using the binary number system's two binary digits, 0 and 1. The binary code assigns a value to each symbol or instruction. For example, non-infrared emitting portions, such as those $L_n$ regions not having dots 206, may be assigned a value of "0" while $L_n$ regions that include a dot 206 may be assigned a value of "1". Thus, the identification code 216 for infrared-emitting pattern 600a is "101_011_110" which corresponds to two dots 206 in the first, second and third rows in their respective positions (e.g., columns, rows). The identification code 216 for infrared-emitting pattern 600a is "010_111_011" which corresponds to one dot 206 in the first row, three dots 206 in the second row, and two dots 206 in the third row in their respective positions. The identification codes 216 are stored in a database and can be used to identify the particular object. It should be noted that more or less dots 206 within the infrared-emitting patterns 600a, 600b are readily contemplated. Accordingly, when the monitoring device 108 and/or activity monitoring system detects the infrared-emitting pattern 600a, 600b, the monitoring device 108 and/or activity monitoring system can identify which particular object the user 102 is interacting with.

Figure 7:
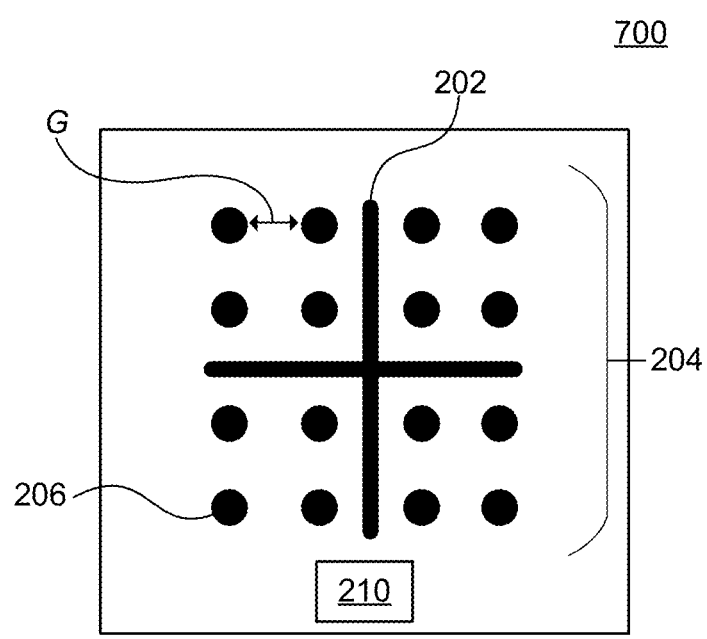
FIG. 7 is a top view showing a thermal image of an infrared-emitting tag in accordance with the present invention.

Now referring to FIG. 7, an alternative configuration of an infrared tag 700 is illustratively depicted. The tag 700 includes infrared-emitting features (e.g., two orthogonal stripes 202 and a plurality of dots 206) which emit infrared light forming a unique infrared-emitting pattern 204. The stripes 202 define the pattern region 204 which includes four quadrants. The quadrants may be used as areas for positioning the infrared-emitting dots 206. In an embodiment, all dots 206 shown in FIG. 7 may be employed. In another embodiment, only a portion of dots 206 shown in FIG. 7 may be employed. Different configurations (e.g., positions) of dots 206 are employed to emit different infrared-emitting patterns 204 and identify different tagged objects 104.

Figure 8:
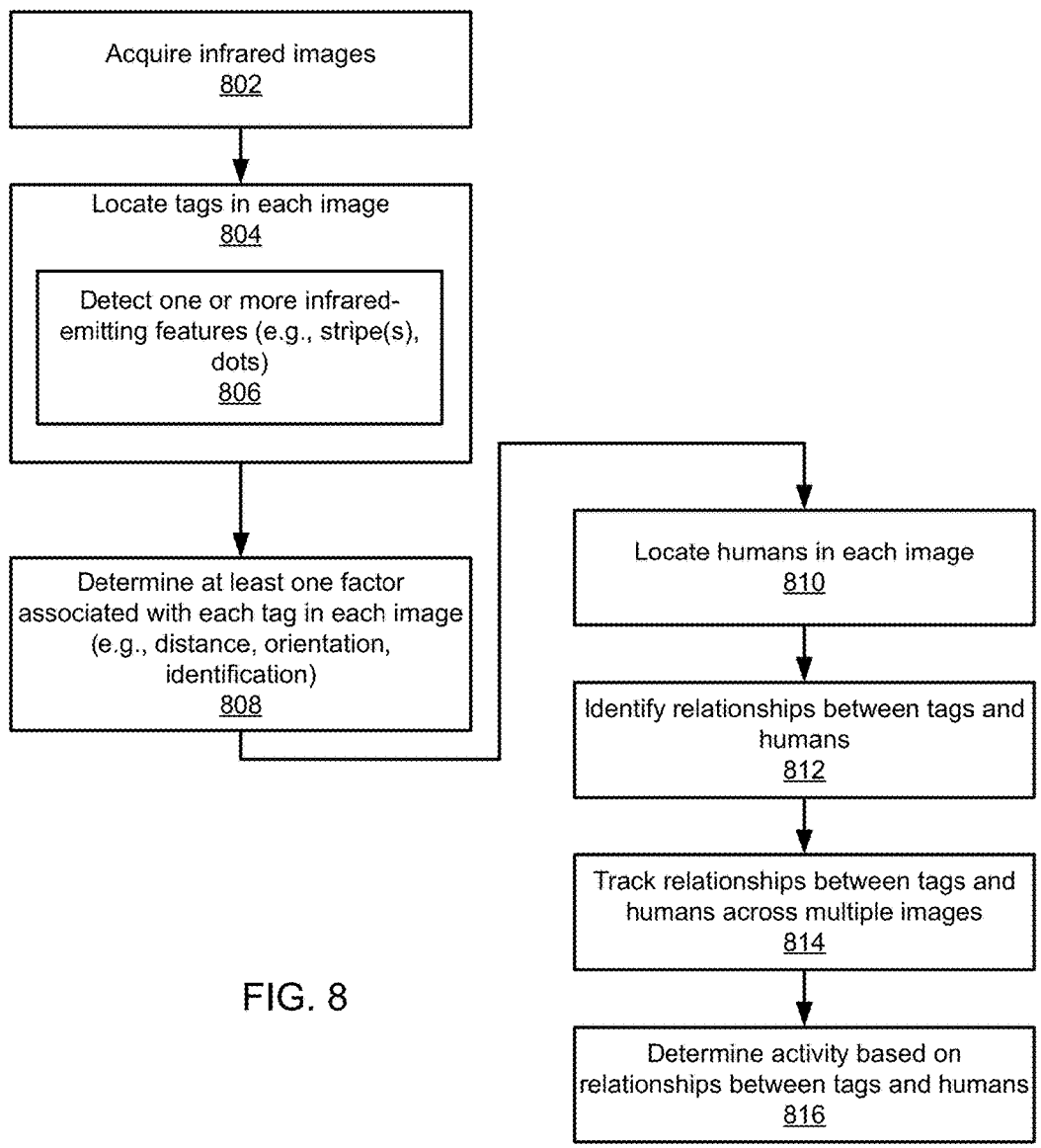
FIG. 8 is a block/flow diagram showing a system/method for determining activities of a monitored person in accordance with the present invention.

Referring now to FIG. 8, with continued reference to FIGS. 1-7, a method 700 of monitoring activity is shown. Block 802 acquires infrared images (e.g., thermal images) of the environment 100 using the monitoring device 108. While other forms of imaging are possible, it should be understood that using only infrared images provides the ability to easily track a user's activity while also preserving as much of the user's privacy as possible.

Block 804 locates any infrared tags 200 that might be present in each image. As noted above, the tags 200 may be attached to objects 104 in the environment 100, and such objects may be fixed or movable. The tags 200 can be located by searching in the thermal image for relatively bright, relatively small patterns in the infrared image. The infrared-emitting patterns are unique to the individual tag 200, either in spatial layout or in temporal sequence. As such, block 804 can identify the object 104 to which the tag 200 is attached.

In some embodiments, locating infrared tags includes detecting one or more infrared-emitting features, as illustrated in block 806. The infrared-emitting features include one or more infrared-emitting stripes 202. For example, the stripes 202 emit infrared light of a predetermined thickness and/or along a predetermined length. In some embodiments, detecting one or more infrared-emitting features includes detecting at least two stripes that are orthogonal to each other. For example, the at least two stripes 202 are connected at a distal end of each stripe 202 such that the stripes form a right angle. Accordingly, miscellaneous lines and/or stripes which are not connected and/or are not orthogonal are avoided. In some embodiments, detecting one or more infrared-emitting features includes applying a Hough Line Transform.

In some embodiments, detecting one or more infrared-emitting features includes detecting at least one infrared-emitting dot 206 within a pattern region 204. The infrared-emitting dots 206 may be within a pattern region 204 defined by the infrared-emitting stripe(s) 202. In some embodiments, the pattern region 204 includes a gap G between each dot 206, the gap G having a minimum distance (e.g., 0.3 cm) between an adjacent dot 206. In some embodiments, the gap G is non-infrared-emitting. Accordingly, miscellaneous dots not forming part of the infrared-emitting pattern are avoided.

In an embodiment, detecting the one or more infrared-emitting features 202, 206 includes quantizing sections within the pattern region into a plurality of quantized sections and detecting dots 206 in one or more quantized sections. As described above, the stripes 202 define the pattern region 204, such as the dimensions of the pattern region 204. In an embodiment, the pattern region 204 is quantized into rows and columns which form a matrix configuration. A quantized section can include a section associated with a single row and a single column.

Block 808 determines at least one factor associated with each tag 200. The at least one factor includes, for example, distance of the tag 200 to the thermal sensor (e.g., monitoring device 108), orientation of the tag 200, and/or an identification associated with the tag 200 (e.g., identify of the tagged object 104). In some embodiments, determining the at least one factor includes detecting an observed length $L_o$ of at least one stripe 202 and/or an observed angle 214b between orthogonal stripes 202 and comparing the observed length $L_o$ and/or observed angle 214b with a predetermined (e.g., actual) length $L_i$ and/or predetermined (e.g., actual) angle 214a, respectively, to determine a distance of the tag 200 from a thermal sensor (e.g., monitoring device 108) in a three-dimensional environment.

In an embodiment, determining the at least one factor includes detecting an observed position of the one or more stripes 202 and comparing the observed position with a predetermined position to determine an orientation of the thermal tag 200 in a three-dimensional environment. In some embodiments, determining the at least one factor includes extracting/detecting positions of each infrared-emitting dot 206 and comparing the positions with a predetermined dot layout to identify the thermal tag 200 and/or tagged object 104. For example, the positions of the dots 206 include a binary code 216 associated with the tagged object 104. Accordingly, the infrared-emitting pattern (e.g., stripes 202, dots 206) is extracted to create context of the captured thermal images of a human's activities and interactions of objects in an environment, despite the effects of thermal diffusion in the environment.

Block 810 locates humans in each image. Humans put out a characteristic pattern of infrared radiation, which will appear as a silhouette in the infrared images. Because the monitoring device 108 responds to light put out according to the warmth of the body, it cannot distinguish fine details such as, e.g., lip movements, which can be privacy sensitive.

Block 812 identifies relationships between the tags 200 located in block 804 and humans detected in block 810. For example, if tag 200 overlaps with a human's silhouette in the infrared image, the human may be interacting with that tag 200. In one specific example, block 812 correlates the location of the tag 200 with that of the human in each of the images. If the location of the tag 200 correlates with that of the human in each detected image, then block 812 determines that the human is interacting with the tag 200. If, however, the tag 200 only overlaps with the human's silhouette in one of three images, then in this example it can be concluded that the person is not actually nearby the tag 200.

It should be noted that the tag 200 may not overlap with a person's silhouette during an interaction. For example, a tag 200 may be attached on one end of a cane, while the person holds the other end of the cane. However, relationships can still be deduced from patterns of relative motion over time in video.

It should be understood that the monitoring device 108 may be sensitive to a range of different infrared wavelengths. In particular, human beings put out infrared emissions at relatively long wavelengths (e.g., greater than about 1 μm). The tags 200 may therefore be configured to emit infrared radiation at relatively short wavelengths (e.g., less than about 1 μm). This allows the system to readily distinguish between humans and tags 200, even when the tag visually overlaps with the human's silhouette.

Block 814 tracks the identified relationships across multiple images. Block 816 then uses the relationships between people and tagged objects, in both space and time, to determine activities. For example, if the human silhouette and a given tag 200 move across the field of view of the monitoring device 108, it can be deduced that the person is holding the object 104 that the tag 200 is attached to. In this example, block 814 therefore tracks the spatial relationship between the person and the tag 200 across multiple frames of a recorded video from the monitoring device 108.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 9:
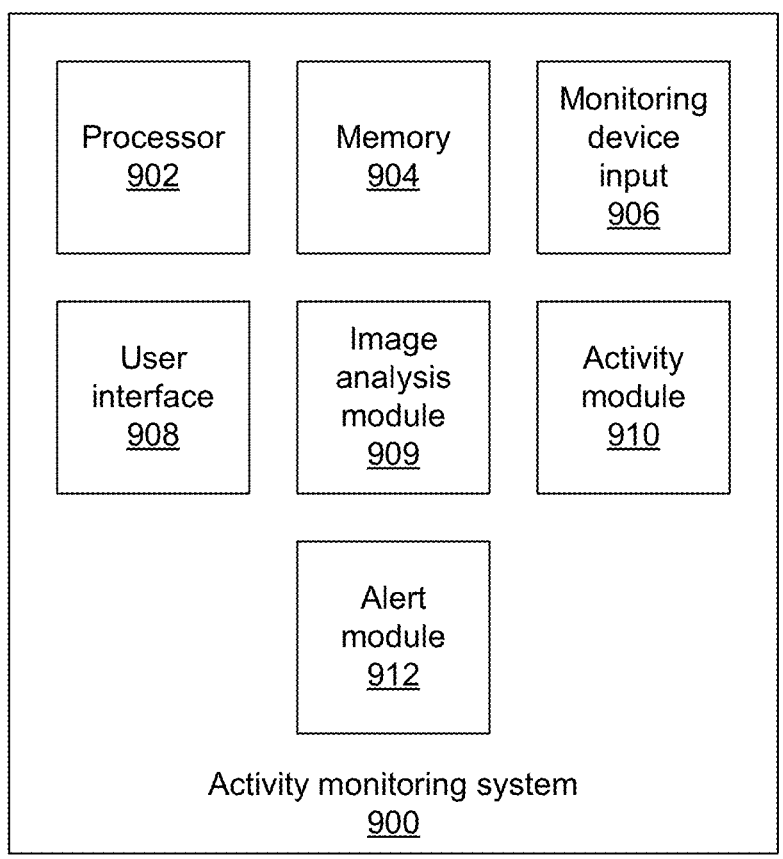
FIG. 9 is a block/flow diagram showing an activity monitoring system in accordance with the present invention.

Referring now to FIG. 9, with continued reference to FIGS. 1-8, an activity monitoring system 900 is shown. The system 900 includes a hardware processor 902 and memory 904. In addition, the system 900 receives image information from the one or more monitoring devices 108 via monitoring device input 906. A user interface 908 allows an operator to monitor current and stored activity information without infringing on the monitored person's privacy any more than is necessary. The memory 904 stores, for example, predetermined information associated with each tag 200. For example, the memory 904 stores predetermined lengths for each stripe 202, predetermined angles between orthogonal stripes 202, predetermined positions of stripes 202, predetermined dot layouts (e.g., position of dots 206), binary codes or other identification information associated with each tag 200.

In addition, the activity monitoring system 900 includes functional modules that may be implemented as software that is stored in memory 904 and executed by processor 902. In an alternative embodiment, the functional modules may be implemented as one or more discrete hardware components, for example in the form of field programmable gate arrays or application specific integrated chips. An analysis module 909 analyzes the images received by the monitoring device input 906 and locates human shapes and tags 200 in each image. In some embodiments, the analysis module 909 determines one or more factors associated with each tag 200, such as a distance of a tagged object 104, an orientation of the tagged object 104, and/or an identification associated with the tagged object 104. For example, the analysis module 909 may analyze features of the infrared-emitting features (e.g., at least one stripe 202 and/or plurality of dots 206) to determine the one or more factors. An activity module 910 then correlates the positions of human shapes and tags 200 in both time and space and determines relationships between them. Based on the determined relationships, conclusions can be automatically drawn regarding a person's activities.

An alert module 912 is included to provide an alert to an operator if the activity module determines that one or more conditions is satisfied. The alert module 912 alternatively provides any of a variety of functions. In a first example, the alert module 912 may remind a patient to adhere to a routine. In this first example, the system can detect whether a user has interacted with a tagged pill bottle (based on the detected interaction with the tagged bottle) and taken medication (based on the user's detected motions). If a routine of taking the medication at a specific time is broken, the alert module 912 can communicate with the patient or caretaker to provide a reminder.

In a second example, for a patient with a chronic disease, treatment may depend on the seriousness and frequency of symptoms, such as imbalance, gait change, or slowness of motion. Some symptoms occur sporadically, and it can be difficult to obtain a complete picture of a patient's symptoms when the doctor relies on only the patient's feelings and memories to judge the severity and frequency of symptoms. The alert module 912 can therefore keep a log of events, their frequency, their severity, and any surrounding conditions as they occur for later review.

The alert module 912 may furthermore provide an alert if life-threatening or abnormal behavior or events occur. For example, if the system detects that the person has fallen down and has been on the floor for an extended period of time, the alert module 912 can provide this information to caretakers.

Figure 10:
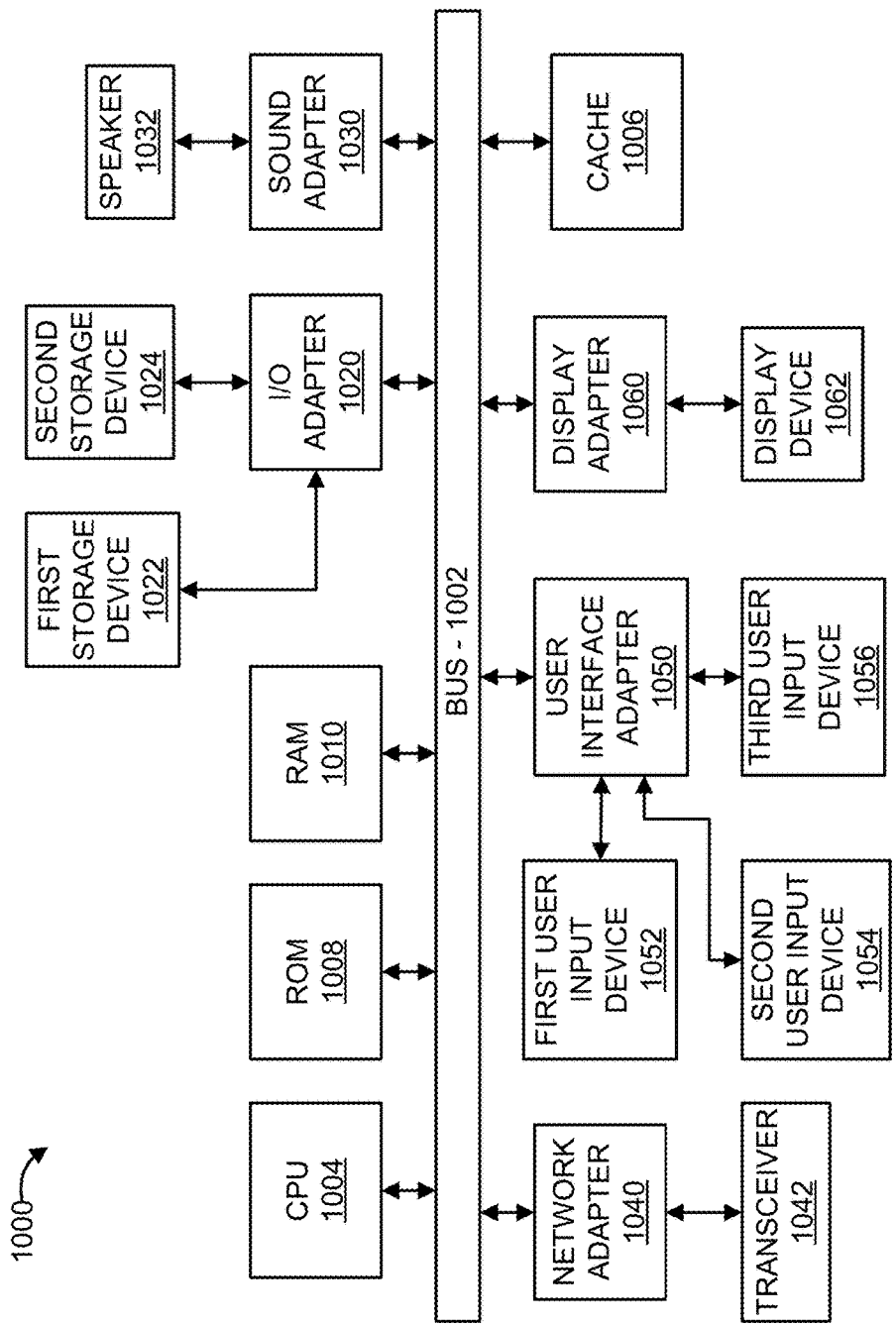
FIG. 10 is a block/flow diagram showing a processing system in accordance with the present invention.

Referring now to FIG. 10, an exemplary processing system 1000 is shown which may represent the activity monitoring system 900. The processing system 1000 includes at least one processor (CPU) 1004 operatively coupled to other components via a system bus 1002. A cache 1006, a Read Only Memory (ROM) 1008, a Random Access Memory (RAM) 1010, an input/output (I/O) adapter 1020, a sound adapter 1030, a network adapter 1040, a user interface adapter 1050, and a display adapter 1060, are operatively coupled to the system bus 1002.

A first storage device 1022 and a second storage device 1024 are operatively coupled to system bus 1002 by the I/O adapter 1020. The storage devices 1022 and 1024 can be any of a disk storage device (e.g., a magnetic or optical disk storage device), a solid state magnetic device, and so forth. The storage devices 1022 and 1024 can be the same type of storage device or different types of storage devices. In some embodiments, the storage devices 1022 and/or 1024 may store information association with the thermal tags 200, such as actual lengths $L_i$ and/or angles $214a$ of stripes 202, position of dots 206 (e.g., dot layout) and/or binary codes identifying the tagged object 104.

A speaker 1032 is operatively coupled to system bus 1002 by the sound adapter 1030. A transceiver 1042 is operatively coupled to system bus 1002 by network adapter 1040. A display device 1062 is operatively coupled to system bus 1002 by display adapter 1060.

A first user input device 1052, a second user input device 1054, and a third user input device 1056 are operatively coupled to system bus 1002 by user interface adapter 1050. The user input devices 1052, 1054, and 1056 can be any of a keyboard, a mouse, a keypad, an image capture device, a motion sensing device, a microphone, a device incorporating the functionality of at least two of the preceding devices, and so forth. It is readily contemplated that other types of input devices can also be used. The user input devices 1052, 1054, and 1056 can be the same type of user input device or different types of user input devices. The user input devices 1052, 1054, and 1056 are used to input and output information to and from system 1000.

The processing system 1000 may also include other elements (not shown), as readily contemplated, as well as omit certain elements. For example, various other input devices and/or output devices can be included in processing system 1000, depending upon the particular implementation of the same. For example, various types of wireless and/or wired input and/or output devices can be used. Moreover, additional processors, controllers, memories, and so forth, in various configurations can also be utilized as readily appreciated. These and other variations of the processing system 1000 are readily contemplated given the teachings of the present principles provided herein.

Having described preferred embodiments of thermal tags for real-time activity monitoring and methods for detecting the same (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A thermal tag, comprising:
a power source to generate current along a resistive path; and
a plurality of infrared-emitting features positioned along the resistive path to emit infrared light along an infrared-emitting pattern, wherein the plurality of infrared-emitting features include one or more infrared-emitting stripes on a first surface of the thermal tag defining a pattern region and a plurality of infrared-emitting dots within a portion of the pattern region to provide a thermal-diffusion resistant pattern for activity monitoring.

2. The thermal tag of claim 1, wherein the one or more infrared-emitting stripes include at least two stripes orthogonal to each other.

3. The thermal tag of claim 2, wherein each of the at least two stripes are connected at a distal portion of each stripe.

4. The thermal tag of claim 1, wherein the one or more infrared-emitting stripes are indicative of at least one factor associated with the thermal tag, the at least one factor being selected from the group consisting of a distance of the thermal tag to a thermal sensor and an orientation of the thermal tag within an environment.

5. The thermal tag of claim 1, wherein each of the one or more infrared-emitting stripes comprises a predetermined length.

6. The thermal tag of claim 1, wherein:
the pattern region includes a plurality of quantized sections, each quantized section being associated with a column and a row of a matrix configuration; and
each of the plurality of infrared-emitting dots is positioned within one quantized section of the pattern region forming a matrix configuration.

7. The thermal tag of claim 6, wherein the matrix configuration is indicative of at least one factor associated with the thermal tag, the at least one factor being identification information associated with the thermal tag.

8. The thermal tag of claim 6, wherein the matrix configuration corresponds to a binary code identifying a tagged object attached to the thermal tag.

9. The thermal tag of claim 6, wherein each of the plurality of infrared-emitting dots is separated from an adjacent dot by a non-infrared-emitting gap.

10. A method for activity monitoring, comprising:
capturing an infrared image of an environment that comprises at least one patient being monitored and at least one infrared-emitting tag;
detecting a plurality of infrared-emitting features arranged in an infrared-emitting pattern on the at least one infrared-emitting tag, wherein the plurality of infrared-emitting features include one or more infrared-emitting stripes on a first surface of the at least one infrared-emitting tag defining a pattern region and a plurality of infrared-emitting dots within a portion of the pattern region to provide a thermal-diffusion resistant pattern; and
tracking a relationship between the patient being monitored and the at least one infrared-emitting tag using a processor.

11. The method of claim 10, wherein detecting the plurality of infrared-emitting features includes applying a Hough Line Transform.

12. The method of claim 10, wherein detecting the plurality of infrared-emitting features includes quantizing the pattern region into quantized sections and detecting at least one infrared-emitting dot within at least one quantized section.

13. The method of claim 10, further comprising determining at least one factor associated with the at least one infrared-emitting tag.

14. The method of claim 13, wherein determining the at least one factor includes detecting an observed length of the one or more infrared-emitting stripes and comparing the observed length with a predetermined length of the one or more infrared-emitting stripes to determine a distance of the at least one-infrared emitting tag to a thermal sensor.

15. The method of claim 13, wherein determining the at least one factor includes detecting an observed position of the one or more infrared-emitting stripes and comparing the observed position with a predetermined position of the one or more infrared-emitting stripes to determine an orientation of the at least one-infrared emitting tag within an environment.

16. The method of claim 13, wherein determining the at least one factor includes detecting a position within the pattern region of each of the plurality of infrared-emitting dots and comparing the position with a predetermine dot layout to determine identification information associated with the at least one infrared-emitting tag.

17. A non-transitory computer readable storage medium comprising a computer readable program for activity monitoring, wherein the computer readable program, when executed on a computer, causes the computer to execute:

capturing an infrared image of an environment that comprises at least one patient being monitored and at least one infrared-emitting tag;

detecting a plurality of infrared-emitting features arranged in an infrared-emitting pattern on the at least one infrared-emitting tag, wherein the plurality of infrared-emitting features include one or more infrared-emitting stripes on a first surface of the at least one infrared-emitting tag defining a pattern region and a plurality of infrared-emitting dots within a portion of the pattern region to provide a thermal-diffusion resistant pattern; and tracking a relationship between the patient being monitored and the at least one infrared-emitting tag using a processor.

18. The non-transitory computer readable storage medium of claim 17, further comprising determining at least one factor associated with the at least one infrared-emitting tag.

19. The non-transitory computer readable storage medium of claim 18, wherein determining the at least one factor includes detecting an observed length of the one or more infrared-emitting stripes and comparing the observed length with a predetermined length of the one or more infrared-emitting stripes to determine a distance of the at least one-infrared emitting tag to a thermal sensor.

20. The non-transitory computer readable storage medium of claim 18, wherein determining the at least one factor includes detecting an observed position of the one or more infrared-emitting stripes and comparing the observed position with a predetermined position of the one or more infrared-emitting stripes to determine an orientation of the at least one-infrared emitting tag within an environment.

* * * * *